May 16, 1967 J. B. GEYER 3,319,316
METHODS OF SEPARATING, ORIENTING AND ASSEMBLING
A PLURALITY OF ENTANGLED ARTICLES
Filed July 6, 1964 5 Sheets-Sheet 1

INVENTOR.
J. B. GEYER
BY
R. Y. Peters
ATTORNEY

United States Patent Office 3,319,316
Patented May 16, 1967

3,319,316
METHODS OF SEPARATING, ORIENTING AND ASSEMBLING A PLURALITY OF ENTANGLED ARTICLES
James B. Geyer, Baltimore, Md., assignor to Western Electric Company, Incorporated, New York, N.Y., a corporation of New York
Filed July 6, 1964, Ser. No. 380,413
7 Claims. (Cl. 29—155.5)

This invention relates to methods of orienting a plurality of entangled articles. More particularly, this invention relates to methods of separating and orienting a plurality of entangled articles with vibratory energy and then assembling within a receptacle such articles along with other articles.

In telephony, protectors having protector units threaded therein are used to protect telephone apparatus as well as people who come into contact therewith from electrical shock, emanating from lightning and other sources of high voltages or current. One such protector unit includes a spring, a fusible disk which melts upon the occurrence of a high current, a cage having a flat base with resilient fingers angularly extending therefrom, and various ceramic and carbon elements, all of which must be assembled into a receptacle of the protector unit. The assembled protector units are then threaded into the protector base. The usual practice is to manually separate, orient and then assemble all these elements in the protector unit. Obviously, such a procedure is time consuming as well as costly and tedious, requiring extreme dexterity on the part of operators.

Accordingly, an object of the invention is the provision of new and improved methods of orienting a plurality of entangled articles.

A further object of the invention is to provide methods of separating and orienting a plurality of entangle articles with vibratory energy.

A further object of the invention is the provision of methods of assembling a plurality of protector elements within the receptacle of a protector unit.

With these and other objects in view, the present invention contemplates a method of orienting a plurality of entangled articles having flat bases with a plurality of resilient fingers extending angularly from each of the bases. In carrying out this method, the entangled articles are positioned on a plate having a plurality of apertures with radially extending slots. Then the plate is vibrated, resulting in the separating of the entangled articles and then the stacking of them one on top of the other in the apertures of the plate to engage the fingers of the articles with the outer edges of the slots.

Other objects and advantages of the present invention will be apparent from the following detailed description when considered in conjunction with the accompanying drawings, wherein.

Figure 1:
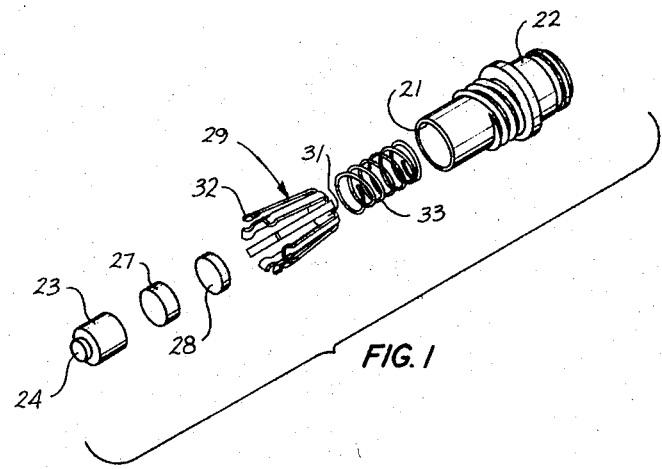
FIG. 1 is an exploded perspective view of a plurality of protector unit elements which are to be separated from like elements, oriented and then assembled in the receptacle of the cap of the protector unit by the methods of the present invention.
Figure 2:
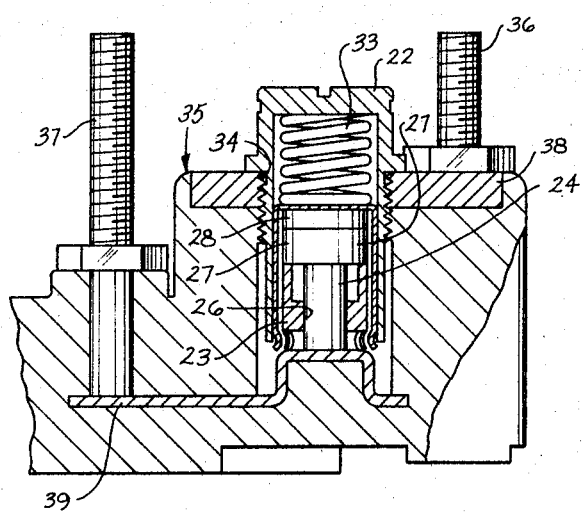
FIG. 2 is a front elevation partly in section of a protector base into which the protector units of FIG. 1 are to be threaded.

Attention is first directed to FIG. 1 in which there is shown a plurality of protector elements which are to be separated from groups of like elements, oriented, and then assembled within a receptacle 21 of an externally threaded protector unit cap 22. These protector elements include a cap-shaped ceramic holder 23, shown in section in FIG. 2, with a cylindrical carbon element 24 protruding from and cemented within a central aperture 26 of the holder 23. Other protector elements which must be assembled within the receptacle 21 of the cap 22 are a carbon disk 27, a fusible disk 28, a cage, designated generally by the reference numeral 29, having a flat base 31 with a plurality of resilient fingers 32–32 extending angularly from the base 31, and finally a spring 33. All of these protector elements must be assembled in the exact order shown in FIG. 1 within the receptacle 21 of the cap 22. Such assembly may be efficiently accomplished according to the methods of the present invention.

After all the protector elements are assembled, as described hereinafter, within the receptacle 21 of the cap 22, such cap 22 having external threads thereon is screwed within an internally threaded receptacle 34 of a protector base, generally designated by the number 35.

In accomplishing electrical protection, a conductor, such as, for example, a telephone line connected to telephone apparatus, is secured to a first terminal 36 while a second terminal 37 is grounded. In the event high voltages from lightning, or similar source, appears across the telephone line secured to the terminal 36 and ground connected to the terminal 37, such voltages are carried by a conductor 38 to the cap 22, the spring 33, the cage 29, the fusible disc 28, and the carbon disc 27. If the voltage is of sufficient value, it jumps a predetermined gap (so small it cannot be shown in FIG. 2) between the carbon disk 27 and the carbon element 24 to such element 24 and then through a conductor 39 to ground connected to terminal 37. Therefore, such high voltages will come into contact with the telephone apparatus or people who may come into contact with the telephone apparatus.

Repeated occurrences of high voltage produce currents to ground which, if they continue for a sufficiently long period of time, melt the fusible disc 28, causing spring 33 to push the fingers 32—32 of the cage 29 into engagement with the conductor 39 to connect the terminal 36 to ground, precluding such electrical voltages and current from coming into contact with the apparatus connected to terminal 36 or people having access thereto.

To illustrate the methods of the present invention, reference is now made to FIGS. 3–6, where there is shown a first plate 51, having a plurality of pairs of concentric apertures 52—52 and 53—53. Each aperture 52, which is larger than and tapers into its corresponding concentric aperture 53, is proportioned to just receive the ceramic holder 23, while the aperture 53 is just large enough to receive the carbon element 24. Further, each group of concentric apertures 52—52 and 53—53 is equally spaced from the immediately surrounding groups of apertures 52—52 and 53—53. Moreover, due to the geometry, as clearly shown in FIGS. 2, 4 and 5, of the holder 23 and the protruding carbon element 24, the center of gravity of the combined holder 23 and element 24 is substantially displaced away from the geometric center of the holder 23 and towards the protruding end of such element 24.

Figure 6:
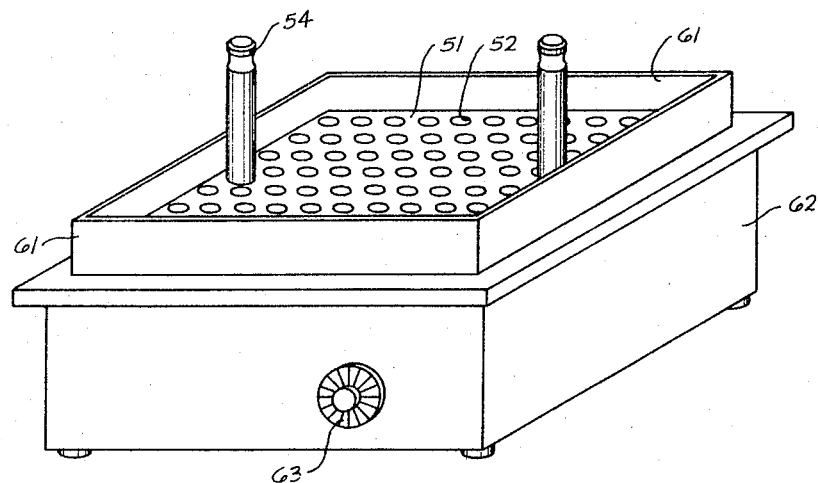
FIG. 6 is a perspective view of an apertured plate positioned on a vibratory table to impart vibratory energy to the plate to effectuate separating and orienting of some of the protector elements of FIG. 1.

The first plate 51 is positioned by any convenient holding means, such as handles 54—54, FIG. 6, within a space defined by a plurality of retaining walls 61—61 which are fixed to the top of the vibratory table 62.

Then, a plurality of the cap-shaped ceramic holders 23—23, each with its cylindrical carbon element 24 protruding from and cemented within its central aperture 26, are poured onto the first plate 51.

Figure 5:
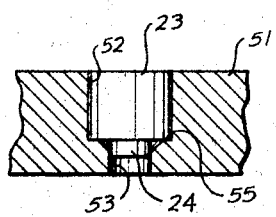

Next, the vibratory table 62 is energized by a control element 63. Energization of the table 62 vibrates such table 62 to orient the holders 23—23 and carbon elements 24—24 so that substantially all the carbon elements and holders are positioned with the carbon elements protruding downwardly, as shown in FIG. 5. Such orientation is aided by the displacement of the center of gravity of the holders 23—23 and carbon elements 24—24 and the equidistant spacing of the concentric groups of apertures 52—52 and 53—53 from the surrounding groups of apertures 52—52 and 53—53.

Figure 4:
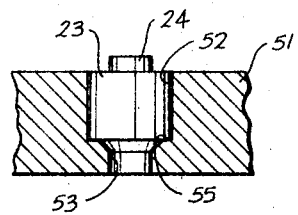
FIGS. 4 and 5 show one of the apertured plates of FIG. 3 into which some of the protector elements, cap-shaped ceramic holders with cylindrical carbon elements protruding therefrom, are oriented.

Statistically, less than about five percent of the holders 23—23 and carbon elements 24—24 are not oriented with the carbon element protruding downwardly as shown in FIG. 5, but are oriented with the carbon element protruding upwardly as shown in FIG. 4. Since an improperly oriented holder 23 rests on a shoulder 55 of the plate 51, it may be very easily grasped by tweezers or the like, not shown, inverted, and reinserted into the apertures 52—52 and 53—53 to achieve the orientation shown in FIG. 5.

Figure 13:
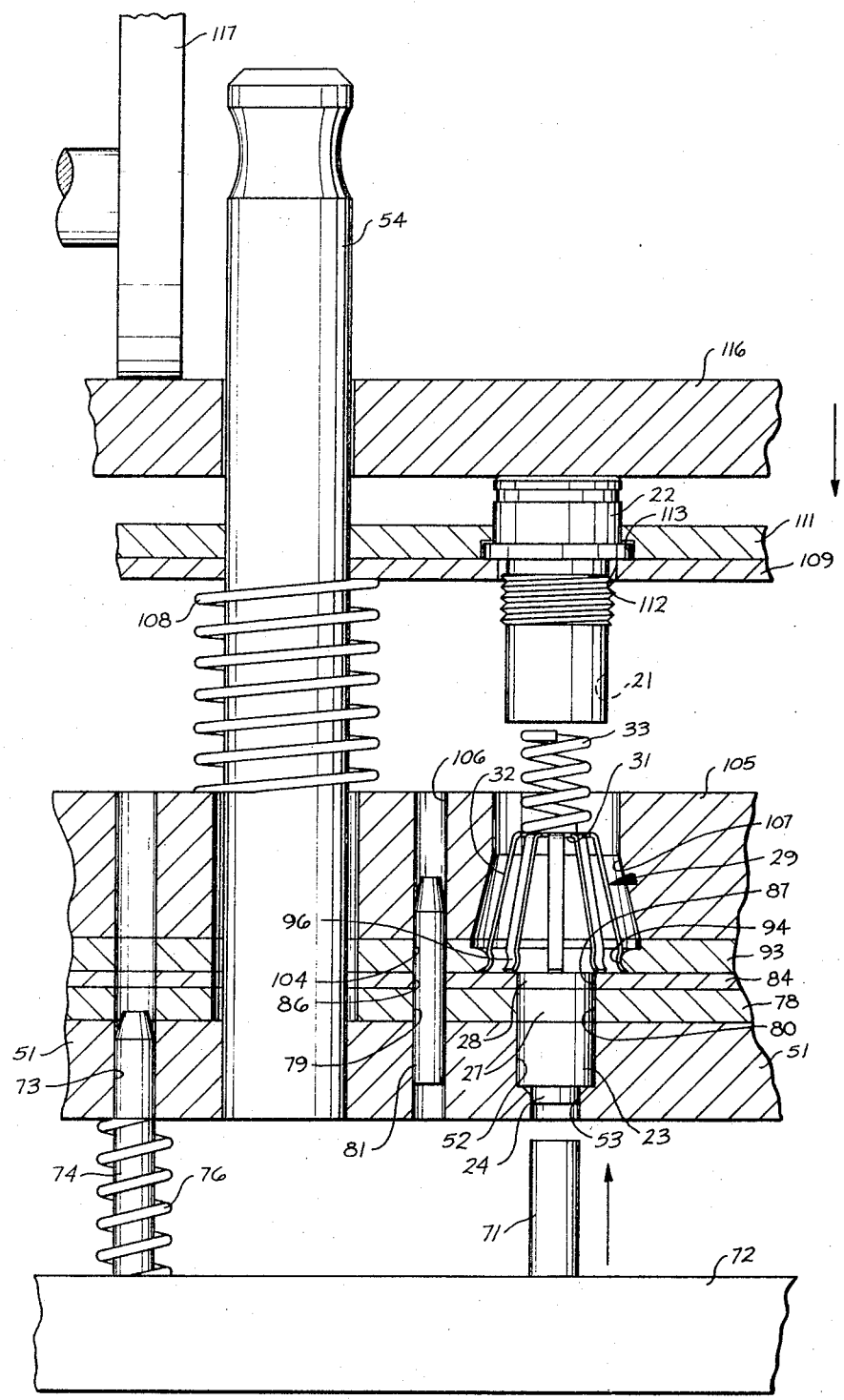
FIG. 13 shows an apparatus for assembling the variously oriented protector elements into the receptacle of the threaded protector unit cap of FIG. 1.

Next, the plate 51 is removed from the table 62 by means of the handles 54—54 and positioned on the assembly apparatus of FIG. 13 such that the ceramic holders 23—23 and carbon elements 24—24 are oriented with the protruding carbon elements in a downward position and in alignment with a stationary plunger 71 fixed to a support 72. This alignment is effectuated by a locating aperture 73 provided in the plate 51 and a tapered locating pin 74, having a compression spring 76 thereabout, which is inserted into such aperture 73.

Figure 3:
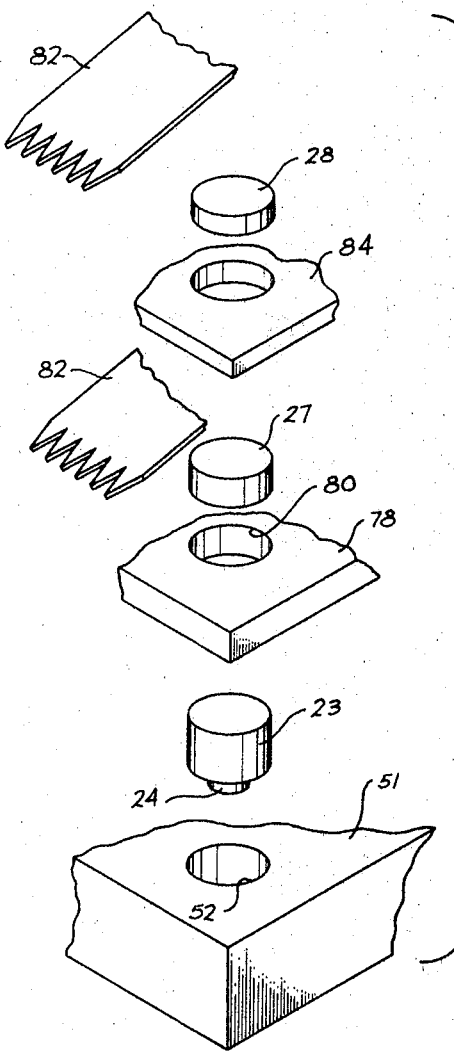
FIG. 3 is an exploded perspective view showing apertured plates into which some of the protector elements of FIG. 1 are to be oriented.

After the first plate 51 is positioned as shown in FIG. 13, a second plate 78, FIGS. 3 and 13, having a locating aperture 79, is positioned on top of the first plate 51 so that another tapered locating pin 81, imbedded within the plate 51 projects upwardly into the aperture 79, thereby aligning each of the apertures 52 of the first plate 51 with each of a plurality of apertures 79—79 in the second plate 78.

With the plate 78 positioned on top of the plate 51, a plurality of the carbon disks 27—27 are poured on top of the plate 78. Then, a flexible wiper 82, FIG. 3, is moved across the top of the plate 78 to locate one of the disks 27—27 in each of a plurality of apertures 80—80 of the plate 78.

Next, a third plate 84, FIGS. 3 and 13, having a locating aperture 86, is placed on top of the second plate 78 so that the tapered locating pin 81 projects upwardly into the aperture 86 to align each of the apertures 80—80 of the second plate 78 with each of a plurality of apertures 87—87 of the third plate 84. In the same manner that the disks 27—27 are located within the apertures 79—79, so also the fusible disks 28—28 are positioned within the apertures 87—87 of the third plate 84.

Referring now to FIGS. 6–9, there is shown a fourth plate 88 having a plurality of equidistantly spaced apertures 89—89 with radially extending equidistant slots 91—91. Such plate 88 is positioned on the vibratory table 62 in the same manner that the plate 51 was previously placed on such table 62.

Figure 7:
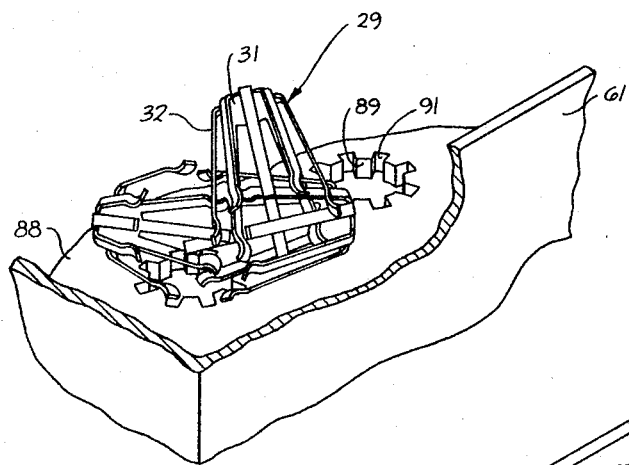
FIG. 7 shows a plurality of some of the protector elements, cages having flat bases with resilient fingers extending angularly therefrom, which are entangled one with the other and are resting on an apertured plate.

Then, a plurality of the cages 29—29, each having the flat base 31 and resilient fingers 32—32 extending angularly from such base 31, are poured onto the fourth plate 88. Since the cages 29—29 are poured en masse onto the fourth plate 88, some of the fingers 32—32 of some of cages 29—29 are often entangled with some of the fingers of other cages, as shown in FIG. 7.

After pouring the cages 29—29 onto the plate 88, the table 62 is energized by the control element 63 to impart vibrations to the entangled cages. Such vibrations result in the separating of the cages 29—29 one from the other and in orienting them in stacked relationship one on top of the other in the apertures 89—89 with the fingers 32—32 of the bottom or last cage of the stack of cages resting on the outer radial edges of the slots 91—91, as shown in FIGS. 8 and 10–12.

Figure 8:
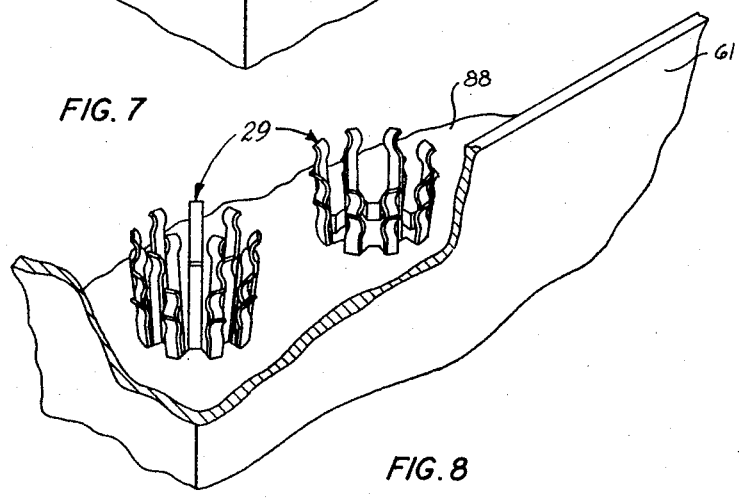
FIG. 8 shows the cages in their disentangled and oriented position, one cage being stacked on top of the other in the apertures of the oriented plate.

Statistically, only about one percent of the cages 29—29 are not disentangled by the vibrations from the table 62; these cages are picked up by tweezers, not shown, and are manually oriented into the position shown in FIG. 8.

Figure 10:
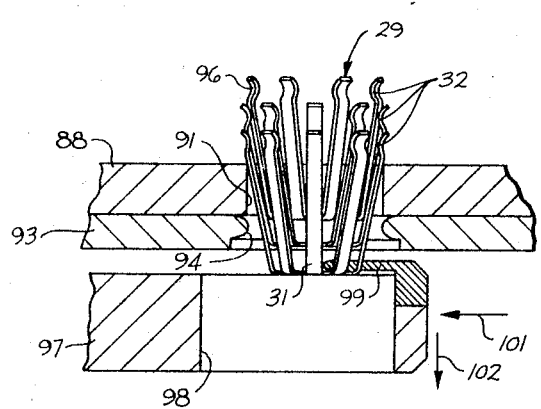
FIGS. 10, 11 and 12 illustrate the various steps for removing the last cage of a stack of cages from the apertured plate of FIG. 7 and positioning such last cage into another apertured plate.
Figure 9:
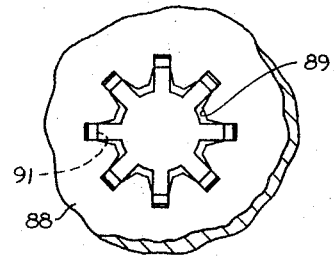
FIG. 9 is a plan view of a portion of the apertured plate of FIGS. 7 and 8 showing a plurality of equidistantly spaced radial slots, the edges of which engage the resilient fingers of the cages.
Figure 11:
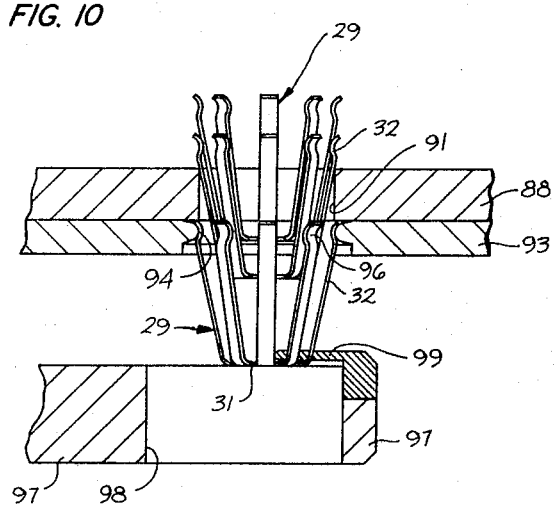
Figure 12:
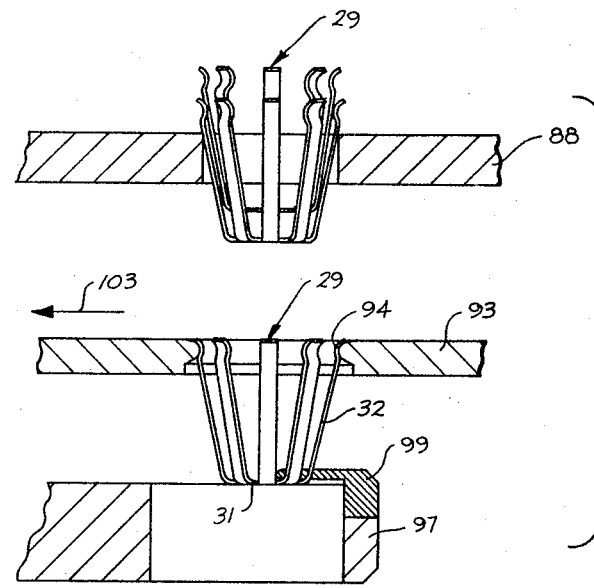

Considering now the apparatus shown in FIGS. 10–12, the fourth plate 88, having the cages 29—29 stacked in the apertures 89—89 as shown in FIG 8, is positioned in alignment with a fifth plate 93 to align each of the apertures of the fourth plate with each of a plurality of apertures 94—94 of the fifth plate. The apertures 94—94 have the edges thereof rounded off to receive concavities 96—96 formed on the ends of the resilient fingers 32—32.

Then, a sixth plate 97 having a plurality of apertures 98—98 and claws 99—99 extending over each of the apertures is moved leftwardly in the direction of the arrow 101, FIG. 10, to move the claws between pairs of the fingers 32—32 and over the tops of the bases 31—31 of the bottom cages 29—29 of the stacks of cages.

Next, the sixth plate 97 is moved downwardly in the direction shown by the arrow 102 to pull the bottom cages 29—29 of the stack of cages downwardly to engage the concavities 96—96 with the rounded edges of the apertures 94—94, as shown in FIG. 11. Such downward movement of the bottom cages 29—29 of the stacks of cages shifts the remaining stacks downwardly until the resilient fingers 32—32 of the second from the bottom cages rests on the edges of the slots 91—91 of the apertures 89—89 of the fourth plate 88.

Then, the fifth plate 93 and sixth plate 99 are moved as a unit to separate the fifth plate 93 from the fourth plate 88, as shown in FIG. 12.

After the separation, the fifth plate 93 is moved leftwardly, as shown by the arrow 103, FIG. 12, to remove the bases 31—31 of the cages 29—29 mounted within the apertures 94—94 away from the claws 99—99 of the plate 97; whereupon, the plate 93 with the cages resiliently and removably mounted thereto is inverted and positioned on top of the third plate 84 so that the tapered locating pin 81 projects upwardly into an aperture 104 of the fifth plate 93 to align each of the apertures 94—94 of the fifth plate with each of the apertures 87—87 of the third plate 84.

After the positioning of the fifth plate 93, a seventh plate 105, FIG. 13, having a locating aperture 106 is placed on top of the fifth plate 93 so that the tapered locating pin 81 projects upwardly into the aperture 106, thereby aligning each of a plurality of passageways 107—107 of the seventh plate 105 with the apertures 94—94 of the fifth plate 93. Then, the springs 33—33 are positioned on top of the bases 31—31 of the cages 29—29 by any conventional dispensing means.

Alternatively, it should be noted that the springs 33—33 may be vibrationally disentangled, oriented and assembled into the caps 22—22, in a manner similar to that in which the ceramic holders 23—23 and carbon elements 24—24 were assembled in the apertures 52 and 53 of the plate 51.

Next, a spring 108 is placed on the handle 54. Then, the caps 22—22, which are removably mounted within apertures 112 and 113 of plates 109 and 111, respectively, are positioned as shown in FIG. 13 by mounting the plates 109 and 111 on the handle 54.

Then, a pushing plate 116 is mounted on the handle 54 and a cam 117 is brought into engagement with the plate 114. Rotation of the cam 117 pushes the plate 114, the caps 22—22, the plates 111 and 109 against the action of the spring 108 to push the receptacles 21—21 of the caps 22—22 over the springs 33—33 to receive such springs therein. Further rotation of the cam 117 bends the resilient fingers 32—32 radially inwardly to disengage the concavities 96—96 thereof from the rounded edges of the apertures 94—94. Still further rotation of the cam 117 moves the plates 105, 93, 84, 78 and 51 downwardly against the action of the spring 76, forcing the plungers 71—71 upwardly into the apertures 53 and 54 of the plate 51 to move the carbon elements 24—24, ceramic holders 23—23, carbon disks 27—27, fusible disks 28—28 into the space between the fingers 32 of the cages 29. As a result, the protector elements of FIG. 1 are assembled in the order shown in FIG. 1 within the receptacles 21—21 of the protector units 22—22.

Although FIGS. 3–5 and 9–13 only exemplify a single group of protector elements, it is to be understood that the present invention contemplates the separation, orientation and assembly of a plurality of groups of protector elements.

It also is to be understood that the above-described embodiment is merely illustrative of an application of the principles of the invention and that various modifications will be apparent to those skilled in the art without departing from the principles and scope of the present invention.

What is claimed is:

1. A method of separating a plurality of entangled articles having flat bases with resilient fingers extending angularly therefrom and orienting the articles, comprising the steps of:
   depositing the entangled articles on a first plate having a plurality of equidistantly spaced apertures,
   imparting vibrations to said first plate to separate the articles one from another and to stack them one on top of the other in the apertures with the bases in a downward position and the fingers resting on the edges of the apertures,
   interrupting the vibrations,
   positioning a second plate having a plurality of apertures under said first plate with the apertures of both plates in alignment, and
   pulling the bottom article from the stack of articles into the apertures of the second plate, whereby the articles are separated one from another and oriented in the apertures of the second plate.

2. A method of separating a plurality of entangled articles having flat bases with resilient fingers having concavities on the ends thereof extending therefrom and orienting the articles, comprising the steps of:
   depositing the entangled articles on a first plate having a plurality of equidistantly spaced apertures with radially extending equally spaced slots,
   imparting vibrations to said first plate to first separate the articles one from another and then to stack them one on top of the other in the apertures with the bases in a downward position and the fingers of the last article of the stack of articles resting on the outer edges of the slots,
   interrupting the vibrations,
   locating a second plate having a plurality of apertures with rounded edges under said first plate with apertures of both plates in alignment, and
   pulling the last article from the stack of articles into the apertures of the second plate and simultaneously bending the resilient fingers inwardly against the edges of the slots to thereby remove the fingers from the slots and resiliently engage the concavities of the ends of said fingers with the rounded edges of the apertures of the second plate, whereby the articles are separated one from another and oriented in the apertures of the second plate.

3. A method of assembling a plurality of elements within a receptacle, comprising the steps of:
   pouring a plurality of cylindrical elements onto a first plate having a plurality of equidistantly spaced apertures for receiving said elements,
   vibrating said first plate to orient said elements within said apertures,
   pouring onto a second plate having a plurality of equidistantly spaced apertures with radially extending slots a plurality of cages having flat bases and having resiliently extending fingers from the bases,
   vibrating said second plate to disentangle and simultaneously stack the cages one on top of the other with the fingers resting on the edges of said radial slots,
   positioning a third apertured plate under the second plate with the apertures of both plates in alignment,
   pulling the bottom cage of the stack of cages downwardly to remove said bottom cage from the apertures of the third plate to engage the fingers of said bottom cage with the edges of the aperture in the third plate,
   stacking the third plate on and in contact with the first plate with the apertures of the plate in alignment with those of the first plate, and
   pushing receptacles with open ends thereof in alignment with the bases of the cages and simultaneously forcing the cylindrical elements upwardly into the space defined by the fingers to engage the base of the cages and to assemble said elements and cages within the receptacles.

4. Method of assembling a plurality of protector elements within the receptacle of a protector unit, which comprises:
   placing a first plate having a plurality of apertures with a ceramic holder removably mounted in each aperture onto an assembly apparatus having stationary plungers positioned beneath the apertures,
   placing a second plate having a plurality of apertures on top of the first plate so that the apertures are aligned with the apertures of the first plate,
   placing a carbon disk in each of the apertures of the second plate,
   placing a third plate having a plurality of apertures on top of the second plate so that the apertures are aligned with the apertures of the second plate,
   placing a fusible disk in each of the apertures of the third plate,
   placing a fourth plate having a plurality of apertures each with a cage having a flat base and resilient fingers extending angularly from each base resiliently and removably mounted in each aperture of the fourth plate on top and in contact with the third plate so that the apertures of the fourth plate are aligned with the apertures of the third plate,
   placing a fifth plate having a plurality of apertures on top of the fourth plate so that the apertures of the fifth plate concentrically enclose the cages,
   placing a spring on top of each base of the cage, and
   lowering a holding device having a plurality of protector caps removably mounted therein to position within each receptacle of the protector caps one spring and one cage and to bend the resilient fingers of each cage radially inwardly to disengage such fingers from the fourth plate and to receive one ceramic holder, one carbon disk and one fusible disk within each cage.

5. A method of assembling protector units to be threaded into protector bases, comprising the steps of:

pouring a plurality of cap-shaped ceramic holders, each with a cylindrical carbon element protruding from and cemented within a central aperture of the holder, onto a first plate having a plurality of equidistantly spaced apertures for receiving said holders and carbon elements with the protruding portions of the carbon elements in downward positions, vibrating said first plate to orient the holders and carbon elements in the apertures with the protruding portions of the carbon elements in downward positions, stacking on said first plate a second plate having a plurality of apertures equal to and in alignment with the apertures in said first plate, wiping a plurality of carbon disks across the apertures in said second plate to position in each aperture one carbon disk, stacking on said second plate a third plate having a plurality of apertures equal to and in alignment with the apertures in said second plate, wiping a plurality of fusible disks across the apertures in said third plate to position in each aperture one fusible disk, pouring onto a fourth plate having a plurality of equidistantly spaced apertures with radially extending equidistant slots a plurality of cages having flat bases and resiliently extending fingers from the bases, vibrating said fourth plate to disentangle and simultaneously stack the cages one on top of the other with the fingers resting on the edges of said radial slots, positioning a fifth apertured plate under the fourth plate with the apertures of both plates in alignment, pulling the bottom cages of the stacks of cages downwardly to engage the fingers of said cages with the edges of the apertures in said fifth plate, stacking the fifth plate on and in contact with the third plate with the apertures of the fifth plate in alignment with those of the third plate, positioning a plurality of springs on the bases of the cages, and pushing a plurality of tubular shells, with the open ends thereof in alignment with the springs, against the springs to receive said springs and simultaneously forcing the carbon elements with their ceramic holders, the carbon disks, and the fusible disks upwardly into the space defined by the fingers and into the shells to thereby assemble the protector units.

6. A method of orienting a plurailty of entangled articles having flat bases with a plurality of resilient fingers extending angularly from each of the bases, comprising the steps of:

positioning the entangled articles on a plate having a plurality of apertures with radially extending slots, separating said entangled articles by vibrating said plate, and stacking said separated articles one on top of the other in said apertures by continued vibration of said plate so that said fingers of said articles engage the outer edges of said slots.

7. A method of separating and stacking a plurality of entangled articles, which comprises the steps of:

pouring onto a plate having a plurality of apertures with radially extending slots a plurality of entangled articles having flat bases with a plurality of resilient fingers extending angularly from each of the bases, separating said entangled articles by vibrating said plate, and stacking said separated articles one on top of the other in said apertures by continued vibration of said plate so that said fingers of said articles engage the outer edges of said slots.

References Cited by the Examiner

UNITED STATES PATENTS

| | | | |
|---|---|---|---|
| 2,143,518 | 1/1939 | Kolin | 209—93 X |
| 2,510,555 | 1/1950 | Christie | 221—156 X |
| 2,768,431 | 10/1956 | Hughes | 29—428 |
| 2,896,311 | 7/1959 | Stafford | 29—155.61 |

JOHN F. CAMPBELL, *Primary Examiner.*

THOMAS H. EAGER, *Examiner.*

UNITED STATES PATENT OFFICE
CERTIFICATE OF CORRECTION

Patent No. 3,319,316

May 16, 1967

James B. Geyer

It is hereby certified that error appears in the above numbered patent requiring correction and that the said Letters Patent should read as corrected below.

Column 1, line 37, for "entangle" read -- entangled --; column 2, lines 45 and 46, for "number" read -- numeral --; line 61, after "will" insert -- not --.

Signed and sealed this 18th day of June 1968.

(SEAL)
Attest:

Edward M. Fletcher, Jr.
Attesting Officer

EDWARD J. BRENNER
Commissioner of Patents